US008032079B2

(12) United States Patent
Schneider et al.

(10) Patent No.: US 8,032,079 B2
(45) Date of Patent: Oct. 4, 2011

(54) HEARING SYSTEM, HEARING DEVICE AND METHOD OF OPERATING AND METHOD OF MAINTAINING A HEARING DEVICE

(75) Inventors: Philip Schneider, Zürich (CH); Stefan Launer, Zürich (CH); Ivo Hasler, Winterthur (CH)

(73) Assignee: Phonak AG, Stafa (CH)

( * ) Notice: Subject to any disclaimer, the term of this patent is extended or adjusted under 35 U.S.C. 154(b) by 1132 days.

(21) Appl. No.: 11/266,509

(22) Filed: Nov. 3, 2005

(65) Prior Publication Data

US 2007/0098194 A1 May 3, 2007

(51) Int. Cl.
*H04Q 7/20* (2006.01)

(52) U.S. Cl. ................. 455/11.1; 455/550.1; 455/569.1; 455/569.2; 455/422.1; 455/414.1; 381/60; 381/312; 381/314

(58) Field of Classification Search ................. 455/11.1, 455/550.1, 569.1, 569.2, 575.1, 575.2, 422.1, 455/403, 517, 418–420, 445, 414.1–414.4; 381/60, 312, 314
See application file for complete search history.

(56) References Cited

U.S. PATENT DOCUMENTS 5,721,783 A 2/1998 Anderson et al.
2002/0054689 A1* 5/2002 Zhang et al. .................. 381/312
2002/0076073 A1 6/2002 Taenzer et al.
2003/0021434 A1 1/2003 Hessel et al.
2003/0133582 A1 7/2003 Niederdrank
2003/0138109 A1 7/2003 Binder et al.
2005/0283263 A1* 12/2005 Eaton et al. ..................... 700/94

FOREIGN PATENT DOCUMENTS

EP 1 256 260 B1 11/2002
JP 2002259714 * 9/2002
WO WO 01/54458 A2 7/2001

* cited by examiner

*Primary Examiner* — Keith Ferguson

(74) *Attorney, Agent, or Firm* — Pearne & Gordon LLP

(57) ABSTRACT

The hearing device is adapted to automatically requesting an establishment of a communication connection to at least one hearing device support provider. The hearing device support provider may comprise a person knowledgeable in hearing devices, at the hearing device seller and/or at the hearing device manufacturer, and it may comprise a computer with a suitable software. Said automatically requesting said establishment of said communication connection will usually happen, when at least one change in internal status of the hearing device occurs, like a failure or a memory overflow or the upcome of a repeatedly occurring event. The hearing device may by itself decide upon the type of change in internal status, which hearing device support provider to connect to. Typically, at least one long-range communication connection is involved.

19 Claims, 3 Drawing Sheets

HEARING SYSTEM, HEARING DEVICE AND METHOD OF OPERATING AND METHOD OF MAINTAINING A HEARING DEVICE

TECHNICAL FIELD

The invention relates to a hearing device, a hearing system, a method of operating a hearing device and a method for maintaining a hearing device. The hearing device can be a hearing aid, worn in or near the ear or implanted, a headphone, an earphone, a hearing protection device, a communication device or the like.

BACKGROUND OF THE INVENTION

Hearing devices, e.g., hearing aids, need, like other devices, some maintenance. When, e.g., a problem occurs in the hearing device, and the user of the hearing device realizes this, said user will usually contact the hearing device seller, his audiologist, or his hearing device fitter in order to get the problem solved. This requires that said user figures out that his hearing device has a problem, and that said user walks by his support person or calls his support person via telephone or the like.

From WO 01/54458 A2 hearing systems and corresponding methods are known, which involve mobile communication devices in fitting, programming or upgrading said hearing systems.

From EP 1 256 260 B1 a fitting system is known, which involves a mobile phone in a fitting process of a hearing system.

SUMMARY OF THE INVENTION

One goal of the invention is to create a hearing device, which allows for an easier maintenance and/or has an increased user-friendliness. Further goals are to provide a hearing system, which allows for an easier maintenance and/or has an increased user-friendliness, and a corresponding method of operating a hearing device and a corresponding method of maintaining a hearing device.

An object of the invention is to relief a hearing device user from some actions he would have to take in conjunction with his hearing device, in particular from actions in conjunction with maintaining or supervising his hearing device.

Another object of the invention is to make a hearing device user's life easier.

Another object of the invention is to improve the possibilities of maintaining and supervising a hearing device.

Another object of the invention is to increase the degree of automation of a hearing device (or hearing system) and of the operation and the maintenance of a hearing device (or hearing system).

These objects are achieved by apparatuses and methods according to the patent claims.

The hearing device is adapted to automatically requesting an establishment of a communication connection to at least one hearing device support provider.

Through this, the above-mentioned goals and objects can be achieved.

The term automatically shall indicate that, in said requesting of said establishment, the hearing device acts autonomously. No external input (e.g., from the user, from an audiologist, or from elsewhere) is needed—at least not in close temporal proximity—for the hearing device to take said action.

The hearing device automatically triggers a process involving an establishment of a communication connection to a hearing device support provider.

The hearing device is capable of automatically triggering such an action. The hearing device can be considered to be able to self-trigger such an action. The hearing device initiates or triggers such an action by itself. Said request is generated automatically by the hearing device. It is possible that the hearing device itself is capable of establishing said communication connection to at least one hearing device support provider. In another embodiment, it may be necessary that for establishing said connection, an (additional) communication device. e.g., a mobile phone, is required for establishing said connection. In that case, said requesting of said establishment of said communication connection may involve, at least if said communication device is not available or not switched on when the hearing device requests said establishment, that the hearing device sends a signal to the user of the hearing device in order to enable said establishment of said communication connection. Said signal can be, e.g., a speech signal, e.g., like "Please switch on your mobile phone. Your hearing device support provider will be contacted.", or a special tone played to the user.

The user can be relieved not only from finding out whether or not it is time to contact his support provider, but also from walking to his support provider, dialing his support provider's telephone number, talking to his support provider and/or describing a problem. The user does not even need to know that and which problem his hearing device might have, or that it is for some other reason (e.g., monthly or yearly control examination) advisable to contact the support provider. The user does not even necessarily need to know that said communication connection is at all established.

The term "requesting" is not meant in the sense of "asking", but rather in the sense of "calling for". The process of establishing said communication connection is initiated or triggered by the hearing device.

In one embodiment, said hearing device comprises a controller, which is capable of deciding that the time has come to establish said connection. It is possible to implement a surveillance software in the hearing device, which detects events that require (or suggest) said establishment of said connection. Such events can be problems of the hearing device or parts thereof, or the fact that a certain time limit is reached, e.g., that one or two years have passed since the last service was performed on the hearing device, so that another service check is indicated.

Said hearing device support provider may be or comprise an individual. Said individual can be a person associated with a manufacturer of said hearing device, e.g., a person of the support provider or trouble-shooting department of the hearing device manufacturer. In another embodiment, said individual is associated with a hearing device seller. The person may be a hearing device fitter. The individual may be a hearing device specialist, an audiologist or another person trained or knowledgeable in the respective hearing devices.

In another embodiment, said hearing device support provider is or comprises a computer with a support software. That computer may be located and/or owned and/or maintained by the hearing device manufacturer or by the hearing device seller or another above-named individual.

If, e.g., the reason why the hearing device requests said establishment of said connection is, that a data storage memory of the hearing device is about to overflow, some or all of the data stored in said memory can be sent (via said communication connection) to said computer and stored by said computer, so as to gain sufficient free data storage memory in the hearing device again. Such a data transfer may take place without the hearing device user knowing about it; the user does not have to bother with such matters.

Said automatically requesting said establishment of said communication connection will usually happen, when at least one change in internal status of the hearing device occurs, in particular, when at least one change in internal status of the hearing device of a predetermined group of changes in internal status of the hearing device occurs. The "internal status" is meant to be a status, which is not decided about externally and/or not caused by (temporally close) actions from outside the hearing aid.

Such a change in an internal status may be, e.g., a failure of said hearing device or of a part thereof. Such a failure may for example be that an output transducer, e.g., a loudspeaker, of the hearing device is defect, which might be detectable by the hearing device, e.g., through the fact that an electrical resistance of said output transducer changes strongly.

Another such change in an internal status may be, e.g., a drop of a charge of a battery of said hearing device or a decline of some other energy source of said hearing device below a certain level; or the fact that such a drop of a charge repeatedly occurs too quickly.

Another such change in an internal status may be, e.g., a drop of an amount of free data storage memory of said hearing device below a certain level. In one embodiment, the hearing device stores data. For example, the hearing device may store data (or information) like described in EP 1 414 271 A2. Therefore, said EP 1 414 271 A2 is herewith incorporated by reference in this application. Such data or information may comprise valuable information for future adaptation of the hearing device to the user's needs, like, e.g., all or some of the actions, which the hearing device user takes in terms of changing hearing device parameters like, e.g., a gain parameter or a hearing program of the hearing device. The amount of corresponding data to store increases with time, and the amount of data storage space in the hearing device is limited. Accordingly, it can be valuable to not discard (part of) such data, but to store them elsewhere, in particular store them at the support provider.

Another such change in an internal status may be, e.g., a reaching of a certain amplification gain during a time span, during which said amplification gain is gradually increased by an acclimatization manager of said hearing device. When a hearing device user receives a new hearing device, which provides for an amplification of acoustic signals to a loudness much higher than what the user perceived before, it can be advisable to firstly use a smaller amplification gain and gradually increase that amplification gain to a desired or final value, because otherwise, the user's hearing experience would in the beginning be unpleasant, because sound would be perceived too loud. This effect is known as "acclimatization effect". An acclimatization manager (usually a software program within the hearing device), is therefore employed to slowly and gradually increase said amplification gain from a low initial level to a target level. Usually, the time during which this increase of amplification gain takes place, is not clearly predictable in real-time, because the gain increase takes place only during the time when the hearing device is switched on or when the hearing device is worn by the user. Accordingly, it can be advantageous to automatically report to the support provider when the target level (or a percentage of the target level) is reached. For example, the support provider, e.g., the audiologist, may then want to schedule a date with the hearing aid user.

Another such change in an internal status may be, e.g., a reaching of a time limit. This may be any kind of time limit, but in particular one, which is of the order of days or weeks or months or even years. E.g., the upcome of repeatedly occurring events like periodic checks, can be said change in internal status.

Said communication connection may comprise at least one long-range communication connection. That long-range communication connection may involve a long-range communication network. The long-range communication connection may be wireless or wire-bound. It may, e.g., involve the Global System for Mobile Communications (GSM), the Universal Mobile Communications System (UMTS), the General Packet Radio Service (GPRS), the Enhanced Data Rate for GSM Evolution (EDGE) or Cellular Digital Packet Data (CDPD) or the like. It may involve the short message system (SMS) and/or e-mails, hypertext transfer protocol (HTTP) messages and Transmission Control Protocol/Internet Protocol messages (TCP/IP). As indicated before, the hearing device may by itself allow for establishing said communication connection, e.g., through a corresponding sender (and possibly also receiver) comprised in the hearing device (e.g., in a part worn in or near the user's ear or in a separate part of the hearing device like, e.g., a remote control). Or the corresponding hearing system comprises a mobile phone or some other (possibly mobile) communication device. Such a communication device may be a computer, e.g., with connection to the internet as long-range communication connection.

The communication connection may (also) comprise a short-range communication connection, e.g., as a connection between the hearing device and the above-mentioned communication device. Also the short-range communication connection may be wireless or wire-bound. It may comprise a short-range communication network. It may comprise a radio frequency communication network like, e.g., Digital Enhanced Cordless Telephony (DECT), Wireless Local area networks (WLAN), Bluetooth, or an optical communications network, like, e.g., one according to the Infrared Data Associate Protocol (IrDA), or the like.

The hearing device can establish a communication connection to a hearing device support provider without any interference of the user or another person, possibly with the exception that possibly involved additional devices (belonging to the hearing system) have to be in a status, which allows the hearing device to connect to them and which allows to finally connect to said support provider. One possible simple example: The user's mobile phone has to be switched on, so that the hearing device can send data via Bluetooth, and it must be located in a place, in-which it can connect to a mobile communication network; and the audiologist's stationary telephone in his office must be connected to the telephone line.

In one embodiment, the hearing device comprises a controller adapted to deciding, in dependence of said at least one change in internal status of the hearing device, which of a number of said at least one hearing device supports to establish a communication connection to. Such a function may, e.g., be implemented in a controller. For example, if the hearing device detects that its power consumption is higher than some upper level, the establishment of a connection to the hearing device manufacturer should be requested (rather than a connection to an audiologist). If, on the other hand, it is detected that the end of the acclimatization time (with a corresponding increase of amplification gain) is over, the audiologist or hearing device fitter is to be contacted (rather than the hearing device manufacturer). Accordingly, the hearing device may be adapted to automatically requesting an establishment of (at least) two communication connections to (at least two) hearing device support providers.

A hearing system according to the invention comprises at least one hearing device according to the invention.

The method of operating a hearing device and the method for maintaining a hearing device may comprise the step of at least one hearing device support provider receiving information via a communication connection established upon a request generated automatically by said hearing device.

The advantages of the methods correspond to the advantages of corresponding apparatuses.

Further preferred embodiments and advantages emerge from the claims and the figures.

BRIEF DESCRIPTION OF THE DRAWINGS

Below, the invention is described in more detail by means of examples and the included drawings. The figures show.

The reference symbols used in the figures and their meaning are summarized in the list of reference symbols. Generally, alike or alike-functioning parts are given the same or similar reference symbols. The described embodiments are meant as examples and shall not confine the invention.

DETAILED DESCRIPTION OF THE INVENTION

Figure 1:
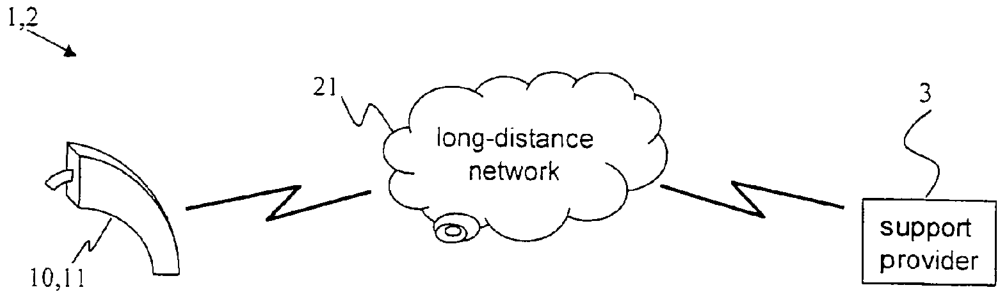
FIG. 1 a schematic diagram of a hearing system and a communication connection.

FIGS. 1, 2, 3 and 4 show schematic diagrams of hearing systems 1 and communication connections 2. As described above, a hearing device 10 can, typically upon a change in the hearing device's internal status, request an establishment of a communication connection 2 to at least one hearing device support provider 3.

In the diagram of FIG. 1 the hearing device 1 comprises only a part 11 to be worn in or near an ear of a user of the hearing device 10. That part 11 is capable of connecting to a long-distance communication network 21, and a hearing device support provider 3 is also connected to the long-distance communication network 21.

Figure 2:
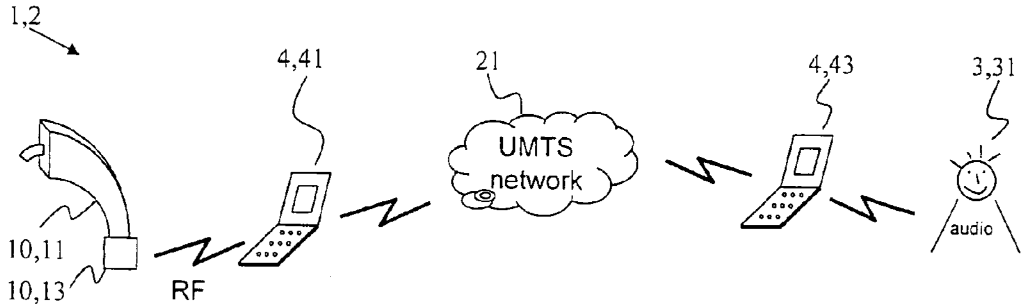
FIG. 2 a schematic diagram of a hearing system and a communication connection.

FIG. 2 shows a schematic diagram of another hearing system 1 and a communication connection 2. Here, the hearing device comprises an add-on device 13, embodied as a radio frequency module 13. Via radio frequency (RF), possibly frequency modulated (FM), a connection from the hearing device 10, more precisely from the module 13, is made to a communication device 40, which is embodied as a mobile phone 41. The mobile communication device 40 connects to a UMTS network, to which also another communication device 40, embodied as a mobile phone (cellular phone) 43 is connected. Said mobile phone 43 belongs to a hearing device support provider, embodied as a person 31 knowledgeable in hearing devices, in particular a hearing device seller 31 or an audiologist 31.

Figure 3:
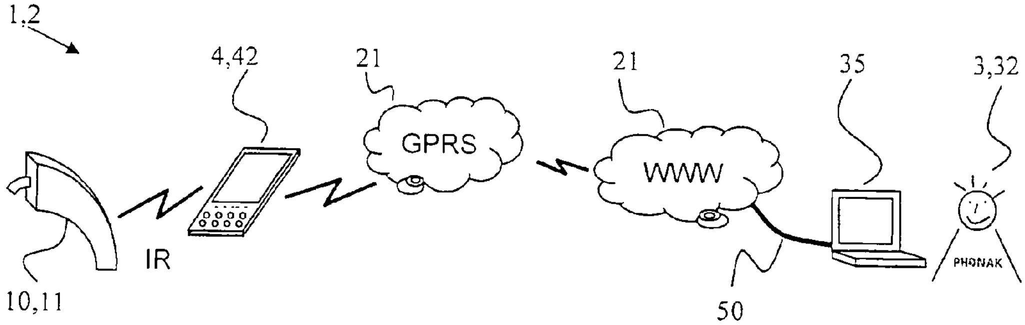
FIG. 3 a schematic diagram of a hearing system and a communication connection.

FIG. 3 shows a schematic diagram of another hearing system 10 and a communication connection 2. In this case, the hearing device 10 is adapted to communicating with a communication device 40, which is embodied as a personal digital assistant (PDA) 42. The PDA 42 is capable of connecting via a GPRS network 21 to the internet 21'. To the internet (www) connected (e.g., as indicated through a wire-bound connection 50) is also a computer 35 belonging to the hearing device manufacturer. A person 32 associated with the hearing device manufacturer, e.g. an employee of the service department of the hearing device manufacturer, can receive information sent via the described communication connection 2 through said computer 35, e.g., as an e-mail.

Figure 4:
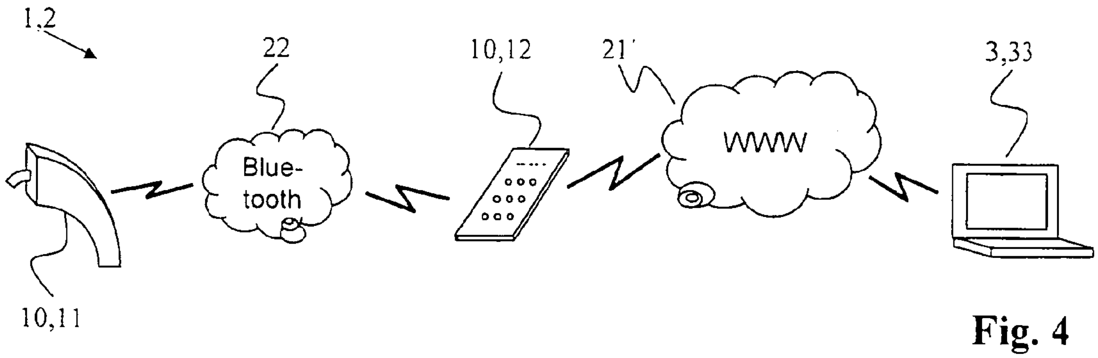
FIG. 4 a schematic diagram of a hearing system and a communication connection.

FIG. 4 shows a schematic diagram of another hearing system 10 and a communication connection 2. In this case, the hearing device 10 comprises a remote control 12 and Bluetooth interfaces, by means of which communication between the part 11 of the hearing device 10 worn at the hearing user's head and said remote control 12 takes place. The remote control 12 is capable of connecting to the internet 21'. A computer 33, which comprises a software capable of handling data sent by the hearing device 10 via the communication connection 2, is connected to the internet 21' and can initiate tasks in reaction to the data received from the hearing device 10. For example, the hearing device manufacturer can be contacted, or the hearing device seller, or the received data or a part of them can be stored in or via the computer 33, or some data like, e.g., a software bug fix, can be sent back to the hearing device 10, so as to automatically solve the problem, which lead to the hearing device's request to establish the communication connection 2.

Typically, the support provider is located remotely or in great distance from the hearing device 10 and from the hearing device user.

The single parts (types of connections, networks, devices) of the communication connections 2 of FIGS. 1 to 4 may also be arranged in different ways; parts of the communication connections 2 may be mixed and replaced within an embodiment and/or between the embodiments of FIGS. 1 to 4.

For example, in the embodiment of FIG. 1, the hearing device 10 may comprise an add-on device similar to the one in FIG. 2, but for connecting to the long-distance network 21. Or, in FIG. 4, the remote control 12 might connect to the internet 21 via a mobile phone instead of directly.

Figure 5:
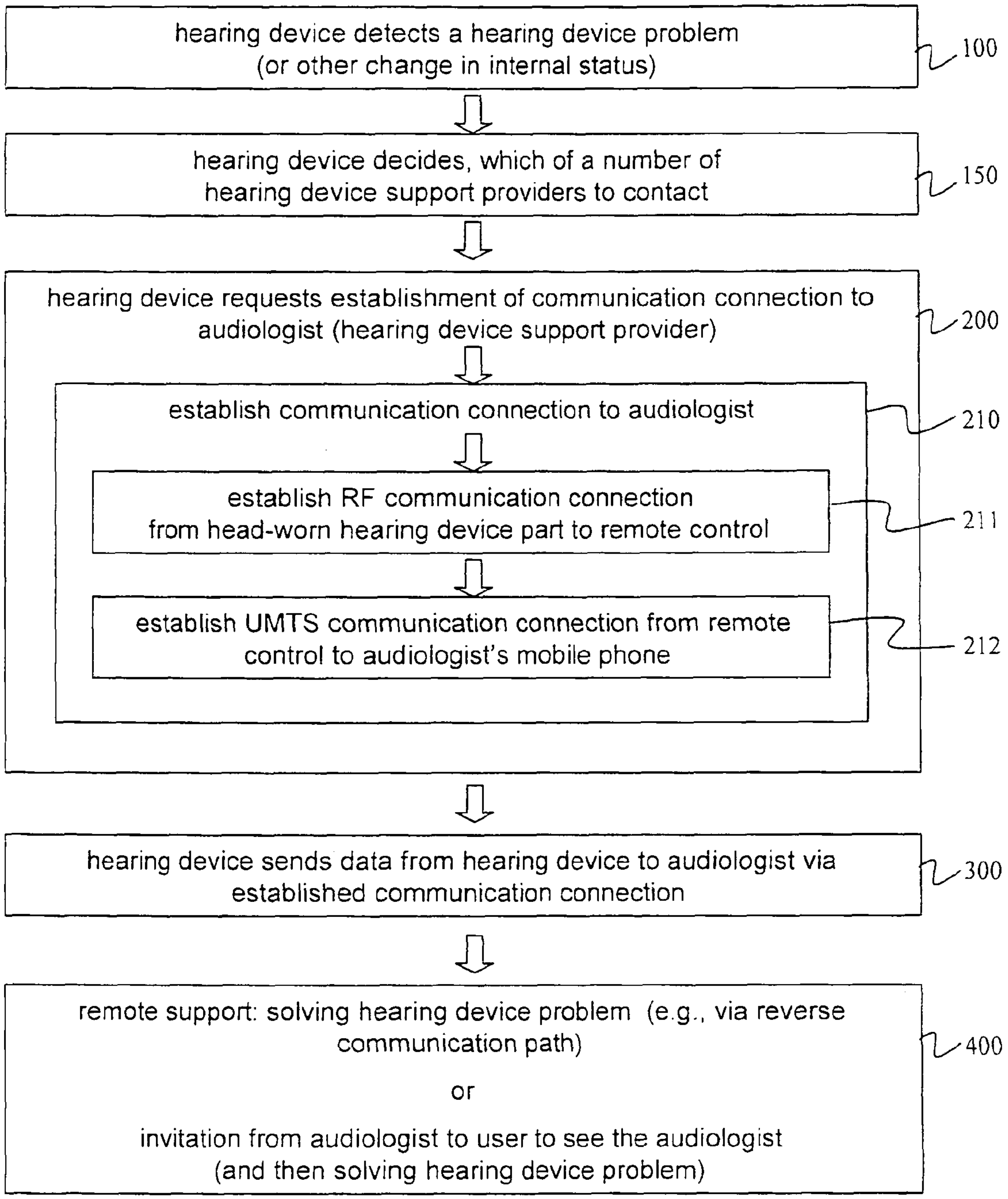
FIG. 5 a flow chart of a method for maintaining a hearing device.

FIG. 5 shows a flow chart of an exemplary method for maintaining or operating a hearing device. In step 100, a change in internal status of the hearing device, e.g., a hearing device problem, is (automatically) recognized by the hearing device.

In step 150, it is decided by the hearing device, which of a number of hearing device support providers to contact (and send information to). Depending on the change in internal status, e.g., the user's audiologist or the hearing device manufacturer or a server (computer) system with an appropriate software might be chosen. It is also possible to choose more than one destination. It is also possible to request (in the following step 200) the establishment of more than one communication connection.

In step 200, the hearing device automatically requests an establishment of a communication connection to a hearing device support provider, e.g., his audiologist. Unless for technical reasons impossible, thereupon the communication connection to the hearing device support provider is established. Such a technical reason might be, that a device participating in the communication connection (e.g., a mobile phone) is not available or is not in an appropriate state (e.g., switched off). If such a technical problem is present, the hearing device might signal this to the hearing device user, who thereupon would possibly remove said technical problem, so that the communication connection can be established. In the example of FIG. 5, the communication connection comprises a radio frequency connection from a part of the hearing device worn near or in the user's ear to a remote control of the hearing device, and a long-range network connection via UMTS from said remote control to the audiologist's mobile phone. These two communication connections are established after each other in the steps 211 and 212.

Once the communication connection between the hearing device and the support provider is established, the hearing device sends data to the support provider (audiologist) via the established communication connection (step 300). The data usually will comprise information indicating at least the make of hearing device and the detected change in internal state of the hearing device, e.g., data indicating which kind of problem occurred.

In step 400, the hearing device support provider takes action in response to the received data. For example, the hearing device support provider may provide for a remote support in the sense, that the hearing device user remains in a location arranged remotely from where the hearing device support provider is located. If it is necessary for this, that data are sent from the hearing device support provider to the hearing device, the established communication connection can be used (possibly immediately), just in the reverse direction.

Maybe, only data have to be stored with the hearing device support provider. In that case, it might be sufficient to store such data and then acknowledge that data storing was successful.

In some cases, it might be necessary to invite the user to see the hearing device support provider (audiologist). Such an invitation may be sent via said established communication connection or can be arranged differently, e.g., by a letter or telephone call from the hearing device support provider to the hearing device user. A possible hearing device problem may then be solved when the two meet.

The invention claimed is:

1. Hearing device that automatically requests, without intervention of a person wearing the hearing device, an establishment of a communication connection to at least one hearing device support provider over a communication network, wherein said hearing device support provider substantially is a computer with a support or maintenance software to remotely communicate with said hearing device over said communication network, and said computer with the support or maintenance software automatically initiates, without user intervention, a task in reaction to data received from said hearing device for automatically solving a problem which lead the hearing device to request said establishment of said communication connection.

2. The hearing device according to claim 1, which is adapted to automatically requesting said establishment of said communication connection to said hearing device support provider when at least one change in internal status of the hearing device of a predetermined group of changes in internal status of the hearing device occurs.

3. The hearing device according to claim 2, wherein said group of changes in internal status of the hearing device comprises at least one of a failure of said hearing device or of a part thereof;

a drop of a charge of a battery of said hearing device below a certain level;

a drop of an amount of free data storage memory of said hearing device below a certain level;

a reaching of a certain amplification gain during a time span, during which said amplification gain is gradually increased by an acclimatization manager of said hearing device;

a reaching of a time limit.

4. The hearing device according to claim 2, which comprises a controller adapted to deciding, in dependence of said at least one change in internal status of the hearing device, which of a number of said at least one hearing device support providers to establish a communication connection to.

5. The hearing device according to claim 1, wherein said communication connection comprises at least one long-range communication connection between said hearing device and said hearing device support provider.

6. The hearing device according to claim 1, wherein said requesting of said establishment of said communication connection comprises sending a signal to a user of said hearing device over said communication network.

7. The hearing device according to claim 1, wherein said hearing device support provider comprises an individual.

8. The hearing device according to claim 7, wherein said individual is associated with a manufacturer of said hearing device.

9. The hearing device according to claim 7, wherein said individual is associated with a hearing device seller.

10. A hearing system comprising a hearing device that automatically requests, without intervention of a person wearing the hearing device, establishment of a communication connection to at least one hearing device support provider over a communication network, wherein said hearing device support provider substantially is a computer comprising a support or maintenance software to remotely communicate with said hearing device over said communication network and to automatically initiate, without user intervention, a task in response to receiving data from said hearing device, where said task is initiated by said computer comprising said support or maintenance software to solve a problem which lead the hearing device to request said establishment of said communication connection; and a communication device adapted to providing for long-range communication connections;

wherein said hearing device is adapted to be functionally connected to said communication device to remotely communicate with said hearing device support provider over said communication network.

11. Method of operating a hearing device, comprising the step of automatically, without intervention of a person wearing the hearing device, establishing a communication connection over a communication network to at least one remotely-located hearing device support provider upon a request generated automatically by said hearing device, wherein said hearing device support provider substantially is a computer with a support or maintenance software to remotely communicate with said hearing device over said communication network, said method further comprising sending data from said hearing device to said computer with said support or maintenance software, wherein said data sent from said hearing device results in said computer automatically, and without user intervention, initiating a task in reaction to receiving said data to solve a problem associated with said hearing device which lead said hearing device to perform said step of establishing said communication connection.

12. The method according to claim 11, comprising the step of establishing a communication connection to at least one hearing device support provider upon a request generated automatically by said hearing device when at least one change in internal status of the hearing device of a predetermined group of changes in internal status of the hearing device occurs.

13. The method according to claim 11 or claim 12, comprising the step of sending a signal to a user of said hearing device over said communication network.

14. The method according to claim 11, furthermore comprising the step of deciding, in dependence of at least one change in internal status of the hearing device, which of a number of said at least one hearing device support providers to establish a communication connection to.

15. The method according to claim 11, comprising the step of generating said request automatically when a problem occurs in the hearing device.

16. The method according to claim 11, wherein said data are data indicative of a problem of the hearing device.

17. The method according to claim 16, wherein said problem is a cause for said request generated automatically by said hearing device, and wherein said initiating at least one task is carried out for automatically solving said problem.

18. Method for maintaining a hearing device, comprising the step of automatically, without intervention of a person wearing the hearing device, requesting establishment of a communication connection over a communication network comprising at least one long-range communication connection to at least one hearing device support provider upon a request generated automatically by said hearing device, wherein said hearing device support provider substantially is a computer with a support or maintenance software that automatically, and without user intervention, initiates a task in response to receiving data from said hearing device, where said task is initiated by said computer comprising said support or maintenance software for solving a problem associated with said hearing device which lead said hearing device to establish said communication connection.

19. A hearing device support system comprising:

a hearing device adapted to automatically, without intervention of a person wearing the hearing device, request an establishment of a communication connection to at least one hearing device support provider; and a computer with a support or maintenance software that is remotely located from said hearing device and is to communicate with said hearing device over a communication network comprising at least one long-range communication connection, wherein said hearing device support provider substantially is said computer and said computer is capable of initiating a task in reaction to data received from said hearing device for automatically, and without user intervention, solving a problem which lead the hearing device to request said establishment of said communication connection.

* * * * *